United States Patent
Song et al.

(10) Patent No.: US 10,611,933 B2
(45) Date of Patent: Apr. 7, 2020

(54) REMOVAL PRESSURE SENSITIVE ADHESIVE OF AQUEOUS EMULSION AND METHOD FOR PREPARING THE SAME

(75) Inventors: Kong-Ju Song, Daejeon (KR); Young-Min Kim, Daejeon (KR); Jae-Woung Ha, Daejeon (KR); Kum-Hyung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 738 days.

(21) Appl. No.: 13/819,648

(22) PCT Filed: Aug. 19, 2011

(86) PCT No.: PCT/KR2011/006113
§ 371 (c)(1),
(2), (4) Date: Feb. 27, 2013

(87) PCT Pub. No.: WO2012/030088
PCT Pub. Date: Mar. 8, 2012

(65) Prior Publication Data
US 2013/0157050 A1    Jun. 20, 2013

(30) Foreign Application Priority Data
Aug. 31, 2010 (KR) ............ 10-2010-0084510

(51) Int. Cl.
| | | |
|---|---|---|
| *C09J 133/08* | (2006.01) | |
| *C09J 133/10* | (2006.01) | |
| *C09J 7/22* | (2018.01) | |
| *C09J 7/21* | (2018.01) | |
| *C08K 5/00* | (2006.01) | |
| *C09J 7/38* | (2018.01) | |
| *C08K 5/11* | (2006.01) | |
| *C08L 21/00* | (2006.01) | |
| *C08K 5/3412* | (2006.01) | |

(52) U.S. Cl.
CPC ........ *C09J 133/08* (2013.01); *C08K 5/0016* (2013.01); *C09J 7/21* (2018.01); *C09J 7/22* (2018.01); *C09J 7/38* (2018.01); *C09J 133/10* (2013.01); *C08K 5/11* (2013.01); *C08K 5/3412* (2013.01); *C08L 21/00* (2013.01); *C08L 2666/02* (2013.01); *C09J 2205/102* (2013.01); *C09J 2400/283* (2013.01); *C09J 2421/00* (2013.01); *C09J 2423/046* (2013.01); *C09J 2423/106* (2013.01); *C09J 2427/006* (2013.01); *C09J 2433/00* (2013.01); *C09J 2467/006* (2013.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 4,340,524 | A * | 7/1982 | Bullman ............... | C08K 5/544 524/297 |
| 5,420,195 | A * | 5/1995 | Mayer ................ | C08F 8/00 524/556 |
| 5,532,300 | A * | 7/1996 | Koubek ............... | A61L 15/58 524/47 |
| 6,586,510 | B1 * | 7/2003 | Brown ................. | C09J 7/0217 428/354 |
| 2004/0116598 | A1 * | 6/2004 | Guo et al. ........... | 524/804 |
| 2005/0137374 | A1 * | 6/2005 | Roesler ............... | C08G 18/283 528/44 |
| 2007/0148444 | A1 * | 6/2007 | Kamiya .............. | C08F 220/18 428/355 AC |
| 2007/0224395 | A1 * | 9/2007 | Rowitsch et al. ....... | 428/143 |
| 2008/0090948 | A1 | 4/2008 | DeWitt et al. | |
| 2009/0291300 | A1 * | 11/2009 | Etoh ................. | C08G 18/6254 428/355 AC |
| 2010/0051200 | A1 * | 3/2010 | Mueller .............. | C09J 133/08 156/703 |
| 2010/0178500 | A1 * | 7/2010 | Wada ................ | C08F 220/18 428/355 AC |

FOREIGN PATENT DOCUMENTS

| | | |
|---|---|---|
| CN | 101165132 A | 4/2008 |
| CN | 101646739 A | 2/2010 |
| JP | 2009-173875 | 8/2009 |
| JP | 2009-1888631 | 8/2009 |
| KR | 10-2009-0033423 | 4/2009 |
| KR | 10-2010-0014957 | 2/2010 |

* cited by examiner

Primary Examiner — Elizabeth A Robinson
Assistant Examiner — Thomas A Mangohig
(74) Attorney, Agent, or Firm — Dentons US LLP

(57) ABSTRACT

Disclosed are a removal aqueous emulsion adhesive, as an aqueous adhesive, which is environmental-friendly, exhibits superior adhesive strength and heat resistance, and low removal noise and is free of ghosts, as compared to rubber-soluble adhesives, and is thus applicable to a variety of commercial labels including labels for cosmetics, medicine, foods, chemical products and promotion, as well as to adhesive sheets such as adhesive labels used for electric and electrical products that require heat resistance and absence of ghosts, and a method for preparing the same.

4 Claims, No Drawings

REMOVAL PRESSURE SENSITIVE ADHESIVE OF AQUEOUS EMULSION AND METHOD FOR PREPARING THE SAME

This application is a National Stage Entry of International Application No. PCT/KR2011/006113, filed Aug. 19, 2011, and claims the benefit of Korean Application No. 10-2010-0084510 filed on Aug. 31, 2010, all of which are hereby incorporated by reference in their entirety for all purposes as if fully set forth herein.

TECHNICAL FIELD

The present invention relates to removal pressure sensitive adhesive of aqueous emulsion and method for preparing the same. More specifically, the present invention relates to a removal aqueous emulsion adhesive, as an aqueous adhesive, which is environmental-friendly, exhibits superior adhesive strength and heat resistance, and low removal noise and is free of ghost, as compared to rubber-soluble adhesives, and is thus applicable to a variety of commercial labels including labels for cosmetics, medicines, foods, chemical products and promotion, as well as in adhesive sheets such as adhesive labels used for electric and electrical products that require heat resistance and absence of residues, and a method for preparing the same.

BACKGROUND ART

An adhesive label commonly called a label or label sticker is widely used in a variety of industries including trademarks and advertising of products as well as printing, chemicals, medicine, home appliances, automobiles and writing supplies. A material to which an adhesive label is adhered may be any natural or synthetic material. The surface paper generally used for adhesive labels is paper such as art paper or vellum paper, or a film such as PET, PVC, PE or PP. The surface is subjected to a predetermined printing process and is thus applied to final products.

The adhesive strength of the adhesive to be coated on the surface of paper may be determined depending on the intended purpose. A permanent adhesive typically has a high adhesive strength of 800 to 1,000 g/in. Paper used as surface paper is torn off when the permanent adhesive is removed. Meanwhile, when a removable adhesive is temporally used for labeling, the removable adhesive should exhibit low adhesive strength, allowing removal, and not be transferred to the material to which the adhesive has been attached.

In order to secure such removability, control of components, cross-linkage density and suitable molecular structures (such as molecular weight and molecular weight distribution) of the adhesive is required. In particular, suitable control of a cross-linking agent is known to enable removability of the adhesive to be controlled.

U.S. Pat. No. 6,586,510 discloses an acrylic adhesive with controlled removability using cross-linking monomers having a variety of functional groups such as allyl methacrylate, diallyl malate or ethylene glycol diacrylate.

In addition, US Patent Publication No. 2004/0116598 discloses an adhesive with superior removability and water-resistance, obtained by applying an aziridine cross-linking agent to an adhesive resin.

Meanwhile, a plasticizer is used to impart workability and flexibility to the adhesive and contribute to reduction of noise generated during removal of the adhesive. US Patent Publication No. 2008/0090948 discloses a combination of a wax such as a polypropylene wax, a polyethylene wax, PTFE or a paraffin wax, and a silicone resin to realize low noise.

However, a plasticizer generally moves to the surface and further involves contamination of the material to which the adhesive is attached. Accordingly, selection of the plasticizer should be made under careful consideration.

Korean Patent Laid-open No. 2009-0033423 discloses an adhesive sheet for optical applications using an acetyl tributyl citrate plasticizer to solve removability and contamination of the material to which the adhesive is attached. U.S. Pat. No. 6,586,510 discloses a removable adhesive comprising 5% or less of a wax and 5 to 12.5% of a triethyl citrate plasticizer. However, these related arts disadvantageously do not satisfy all requirements of superior removability and heat resistance, low release noise and absence of residues.

DISCLOSURE OF INVENTION

Technical Problem

Therefore, the present invention has been made in view of the above problems, and it is one object of the present invention to provide a removal aqueous emulsion adhesive that is environmental-friendly, exhibits superior adhesive strength and heat resistance, and low removal noise and is free of residues, as compared to rubber-soluble adhesives, and is thus applicable to a variety of commercial labels including labels for cosmetics, medicine, foods, chemical products and promotion, as well as in adhesive sheets such as adhesive labels used for electric and electrical products that require heat resistance and absence of residues, and a method for preparing the same.

Solution to Problem

In accordance with an aspect of the present invention, the above and other objects can be accomplished by the provision of a removal aqueous emulsion adhesive comprising: 100 parts by weight of a resin (A) comprising 85 to 99.9% by weight of a (meth)acrylic acid ester monomer having an alkyl group having 1 to 14 carbon atoms i); and 0.1 to 10% by weight of a monomer having a carboxyl group or a hydroxyl group, or a mixture thereof ii); 0.5 to 1.9 parts by weight of a compound having a structure of Formula 1 below (B); 15 to 25 parts by weight of a rubber based resin(C); and 1.1 to 9.9 parts by weight of a plasticizer (D), and a method for preparing the same.

<Formula 1>

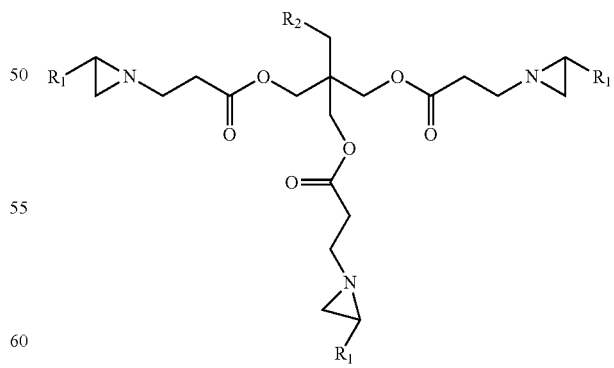

wherein $R_1$ is a hydrogen atom or an alkyl group having 1 to 10 carbon atoms and $R_2$ is a hydroxyl group or an alkyl group having 1 to 12 carbon atoms.

Hereinafter, the present invention will be described in detail.

The removal aqueous emulsion adhesive comprises: 100 parts by weight of a resin (A) comprising 85 to 99.9% by weight of a (meth)acrylic acid ester monomer having an alkyl group having 1 to 14 carbon atoms i); and 0.1 to 10% by weight of a monomer having a carboxyl group, or a hydroxyl group, or a mixture thereof ii); 0.3 to 1.9 parts by weight of a compound having a structure of Formula 1 below (B); 15 to 25 parts by weight of a rubber based resin(C); and 1.1 to 9.9 parts by weight of a plasticizer (D).

Specific examples of the (meth)acrylic acid ester monomer having an alkyl group having 1 to 14 carbon atoms (A) i) include methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, octyl (meth)acrylate, and lauryl (meth)acrylate. These compounds may be used alone or in combination thereof. The (meth)acrylic acid ester monomer (A)i) is preferably present in an amount of 85 to 99.9% by weight, with respect to 100% by weight of the total weight of monomers and cross-linking agent. When the monomer is present in an amount less than 85% by weight, satisfactory initial adhesive strength cannot be secured. Specific examples of the monomer having a carboxyl group (A)ii) include anhydrous maleic acid, fumaric acid, crotonic acid, itaconic acid, acrylic acid, and methacrylic acid. Specific examples of the monomer having a hydroxyl group include hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxylauryl (meth)acrylate, and hydroxypropyl glycol (meth)acrylate. The monomer having a carboxyl group or a hydroxyl group, or a mixture thereof (A) ii) may be present in an amount of 0.1 to 10% by weight, more preferably, 0.1 to 5% by weight, based on 100% by weight of the total amount of the monomers and cross-linking agent. When the content of monomer ii) is within the range defined above, the monomer reacts with an aziridine cross-linking agent to improve cohesive strength of the adhesive resin, prevent removed adhesive labels from being transferred to the surface and reduce removal noise.

The compound having Formula 1 (B) is an exterior cross-linking agent which may react with a functional group of the adhesive resin, reinforces insufficient cohesive strength only with an interior cross-linking agent, prevents the removed adhesive label from being transferred to the surface of a material to which the label has been attached, and reduces removal noise. The compound of Formula 1 is as follows:

<Formula 1>

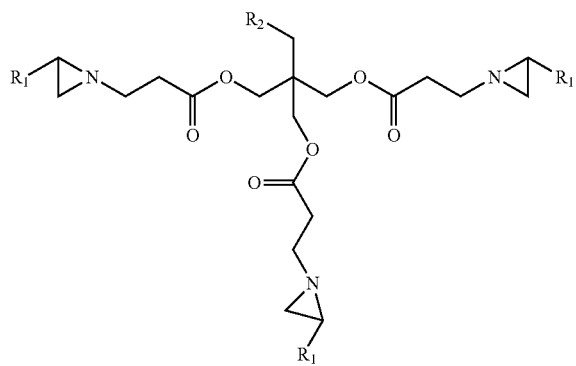

wherein $R_1$ is a hydrogen atom or an alkyl group having 1 to 10 carbon atoms and $R_2$ is a hydroxyl group or an alkyl group having 1 to 12 carbon atoms.

The compound of Formula 1 is preferably tris[([β]-N-aziridinyl)propionate]. Specific examples of the compound include trimethylolpropane tris[([β]-N-aziridinyl)propionate], trimethylolpropane tris[([β]-N-2-methyl-1-aziridinyl)propionate], and pentaerythritol tris[([β]-N-aziridinyl) propionate].

The compound (B) having a structure of Formula 1 is preferably present in an amount of 0.3 to 1.9 parts by weight, based on 100 parts by weight of the emulsion resin. When the content of compound (B) is within this range, the initial adhesive strength and removability of the adhesive are improved and removal noise thereof is reduced.

Advantageously, the rubber based resin(C) improves cohesive strength, heat resistance and initial adhesive strength (tack) of the resin. The rubber based resin(C) is preferably an emulsion-type synthetic rubber. Specific examples of the rubber include styrene-butadiene rubbers (SBR), butadiene rubbers (BR), acrylonitrile-butadiene rubbers (NBR), chloroprene rubbers (CR), isoprene rubbers (IR), isobutylene-isoprene rubbers (IIR), ethylene-propylene rubbers (EPR), and ethylene-propylene-diene rubbers (EPDM). The rubber may be used alone or in combination thereof.

The rubber based resin(C) may be present in an amount of 10 to 50 parts by weight, more preferably, 15 to 25 parts by weight. When the content of rubber based resin is within this range, the adhesive advantageously exhibits superior initial adhesive strength (tack) and heat resistance.

The plasticizer (D) imparts flexibility to an adhesive, and thus controls removability and reduces removal noise. Examples of the plasticizer include dibutyl phthalate (DBP), dioctyl phthalate (DOP), diisononyl phthalate (DINP), diisodecyl phthalate (DIDP), dioctyl terephthalate (DOTP), dioctyl malate (DOM), butylbenzyl phthalate (BBP), trioctyl trimellitate (TOTM), triisononyl trimellitate (TINTM), triisodecyl trimellitate (TIDTM), tricresyl phosphate (TCP), trioctyl phosphate (TOP), cresyl diphenyl phosphate (CDP), triaryl phosphate (TAP), dioctyl adipate (DOA), diisononyl adipate (DINA), diisodecyl adipate (DIDA), triethyl citrate (TEC), tributyl citrate (TBC), acetyl triethyl citrate (ATEC), acetyl tributyl citrate (ATBC), trioctyl citrate (TOC), acetyl trioctyl citrate (ATOC), trihexyl citrate (THC), acetyl trihexyl citrate (ATHC), and trimethyl citrate (TMC).

The plasticizer (D) is preferably introduced in the form of a solution and may be used in an amount of 20 parts by weight or less, more preferably 3.0 to 5.0 parts by weight of a solution containing 55% plasticizer, which is the equivalent of adding 1.65 to 2.75 parts by weight plasticizer to the composition. When the content of plasticizer is 10 parts by weight or more, the surface to which the adhesive is attached is contaminated and adhesive strength is deteriorated. When the content is 1 part by weight or less, removal noise greatly increases.

The resin (A) may further comprise iii) a cross-linking agent having an acrylate group or vinyl group. Examples of the cross-linking agent iii) include allyl methacrylate, 1,6-hexanediol diacrylate, ethylene glycol dimethacrylate, polyethylene glycol diacrylate, polypropylene glycol diacrylate, ethylene glycol diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethylpropane ethoxylate triacrylate, trimethylpropane propoxylate triacrylate, pentaerythritol ethoxylate triacrylate, pentaerythritol propoxylate triacrylate, vinyl trimethoxy silane and divinyl benzene or mixtures thereof.

The cross-linking agent iii) is optionally present in an amount of 5% by weight or less, more preferably, 0.1 to 2% by weight. When the cross-linking agent iii) is within this range, the adhesive advantageously exhibits superior cohesive strength and removability.

The method for preparing the removal adhesive comprises: adding 0.1 to s parts by weight of a polymerization initiator to 100 parts by weight of a monomer mixture (A) comprising 85 to 99.9% by weight of a (meth)acrylic acid ester monomer having an alkyl group having 1 to 14 carbon atoms i), and 0.1 to 10% by weight of a monomer having a carboxyl group or a hydroxyl group, or a mixture thereof ii), and optionally 5% by weight or less of a cross-linking agent having an acrylate or vinyl group iii); and adding 0.3 to 1.9 parts by weight of the compound having a structure of Formula 1 (B), 15 to 25 parts by weight of a rubber based resin(C), and 1.1 to 9.9 parts by weight of a plasticizer (D) to the resulting mixture, followed by dispersion.

The polymerization initiator (A)i) is preferably ammonium persulfate, alkali metal persulfate or hydrogen peroxide, and the polymerization initiator is preferably present in an amount of 0.1 to s parts by weight, more preferably 0.3 to 2 parts by weight, based on 100 parts by weight of the total amount of the monomers and cross-linking agent.

The emulsifier used for the preparation of the removable adhesive may be selected from emulsifiers used for emulsion polymerization and specific examples thereof include anionic emulsifiers such as sodium lauryl sulfate, ammonium lauryl sulfate, sodium dodecylbenzene sulfonate, sodium alkylaryl naphthalene sulfonate, sodium dodecyl diphenyl oxide sulfonate, sodium polyoxyethylene alkyl ether sulfate, sodium polyoxyethylene alkyl phenyl ether sulfate and sodium dialkyl sulfosuccinate; and non-ionic emulsifiers such as polyoxyethylene nonyl phenyl ether, polyoxyethylene alkyl ether, polyoxyethylene alkyl phenyl ether, polyoxyethylene fatty acid ester and polyoxyethylene-polyoxypropylene block polymers. The emulsifier may be used alone or in combination thereof.

The emulsifier is preferably 0.5 to S parts by weight based on 100 parts by weight of the total amount of the monomers and cross-linking agent used for polymerization. The prepared adhesive agent is neutralized with an alkali and is then used as a main ingredient of a removable adhesive. The alkali may be an inorganic material such as a hydroxide, chloride, carbonate of a mono- or bivalent metal, or ammonia or an organic amine, or the like. Of these, ammonia is preferred.

The removal adhesive is prepared by adding a dispersion of the compound having a structure of Formula 1, a rubber based resin and a plasticizer solution to the neutralized adhesive agent.

The removal adhesive is obtained by coating one side of surface paper for adhesive labels with the adhesive agent and the removable adhesive layer preferably has a thickness of 20 to 30 μm.

The surface paper may be PVC, PET, PP, PE or a paper sheet. More specifically, the paper sheet is preferably art paper for the surface of plastics, glasses, boxes and electrical products. The art paper preferably has a thickness of 50 to 200 μm.

The adhesive label is formed by laminating a release paper whose surface is coated with silicone, polyamide or clay on the adhesive layer, to protect the coating of the adhesive, improve storage stability of products and secure evenness. The type of release paper is preferably Kraft or Glassine paper and the thickness of release paper is preferably 100 to 200 μm.

The adhesive layer of the adhesive label preferably has a thickness of 18 to 30 μm.

Advantageous Effects of Invention

As apparent from the fore-going, the present invention advantageously provides a removal aqueous emulsion adhesive that is environmental-friendly, exhibits superior adhesive strength and heat resistance, and low removal noise and is free of residues, as compared to rubber-soluble adhesives, and is thus applicable to a variety of commercial labels including labels for cosmetics, medicine, foods, chemical products and promotion, as well as in adhesive sheets such as adhesive labels used for electric and electrical products that require heat resistance and absence of residues.

BEST MODE FOR CARRYING OUT THE INVENTION

Now, the present invention will be described in more detail with reference to the following Examples. These examples are only provided to illustrate the present invention and should not be construed as limiting the scope and spirit of the present invention.

EXAMPLES

Example 1

<Preparation of Acrylic Adhesive Agent>

200 g of distilled water and 1.2 g of sodium alkylaryl naphthalene sulfonate as an emulsifier were added to a 2 L glass reactor equipped with a stirring blade, a thermometer, a nitrogen gas feed pipe and a reflux condenser, the atmosphere of the reactor was replaced with nitrogen gas with stirring, and the mixture was heated to 70° C. under the nitrogen atmosphere.

8 g of 5% ammonium persulfate (APS) solution was added to the reactor, a solution of 312 g of butyl acrylate (BA), 481 g of 2-ethylhexyl acrylate (2-EHA) and 8 g of acrylic acid (AA) was mixed with a solution of 0.8 g of allyl methacrylate (AMA), 6.8 g of sodium alkylaryl naphthalene sulfonate, 360 g of distilled water and 1.6 g of sodium carbonate, the mixture was reacted for 4 hours while a free emulsion was added dropwise thereto. At this time, 68.8 g of the 5% ammonium persulfate solution and the free emulsion were simultaneously added dropwise over the course of 4 hours.

After the dropwise addition, 5.2 g of the 5% ammonium persulfate solution was added at a time and allowed to stand at 80° C., unreacted monomers were completely reacted and cooled to room temperature, and 28% by weight of an aqueous ammonia solution was added thereto to neutralize the reaction mixture to pH 8 and thereby prepare an acrylic adhesive agent (about 55% solid).

<Preparation of Plasticizer Solution>

As a plasticizer, acetyl tributyl citrate (ATBC) was used. A solution of 0.55 g of sodium alkylaryl naphthalene sulfonate in 45 g of distilled water, as an emulsifier to disperse the plasticizer was added to 55 g of acetyl tributyl citrate. Then, the mixture was dispersed at a rate of 2,500 rpm/min for 5 minutes using a homogenizer to prepare a 55% plasticizer solution.

<Incorporation of Additive>

0.275 g of trimethylolpropane tris[(β)-N-2-methyl-1-aziridineyl]propionate (0.5 parts by weight, based on 100 parts by weight of the total amount of the monomers and cross-linking agent), as a cross-linking agent, 47.8 g of a styrene-butadiene rubber (SBR) solution (20 parts by weight, based on 100 parts by weight of the total amount of monomers and cross-linking agent, solid content: 23%) and 5 g of the 55% plasticizer solution thus prepared (5 parts by weight, based on 100 parts by weight of the total amount of monomers and cross-linking agent) were added to 100 g of the neutralized acrylic adhesive agent, followed by mixing for 10 minutes to prepare a removal adhesive.

<Production of Adhesive Sheet>

The removal adhesive was uniformly applied to a release paper with a thickness of 130±5 μm, dried at 120° C. for 2 minutes and laminated on one side of art paper to produce a sheet for adhesive labels with a thickness of 20±2 μm including a release paper, an adhesive layer and art paper which are laminated from top to bottom in this order.

Example 2

A sheet for adhesive labels was produced in the same manner as in Example 1, except that, in the process of incorporating an additive, 0.55 g (1 part by weight, based on 100 parts by weight of the total amount of monomers and cross-linking agent) of trimethylolpropane tris[(β)-N-2-methyl-1-aziridineyl]propionate was added as the aziridine cross-linking agent.

Example 3

A sheet for adhesive labels was produced in the same manner as in Example 1, except that, in the process of incorporating an additive, 35.9 g of a styrene-butadiene rubber (SBR) solution (15 parts by weight, based on 100 parts by weight of the total amount of monomers and cross-linking agent, solid content of 23%) was added.

Example 4

A sheet for adhesive labels was produced in the same manner as in Example 1, except that, in the process of incorporating an additive, 59.8 g of a styrene-butadiene rubber (SBR) solution (25 parts by weight, based on 100 parts by weight of the total amount of monomers and cross-linking agent, solid content of 25%) was added.

Example 6

A sheet for adhesive labels was produced in the same manner as in Example 1, except that, in the process of incorporating an additive, 3 g of the plasticizer solution (5 parts by weight, based on 100 parts by weight of the total amount of monomers and cross-linking agent) was added.

Example 6

A sheet for adhesive labels was produced in the same manner as in Example 1, except that, in the process of preparing the acrylic adhesive agent, polymerization was carried out without using 0.8 g of allyl methacrylate (AMA) and, in the process of incorporating an additive, 35.9 g of a styrene-butadiene rubber (SBR) solution (15 parts by weight, based on 100 parts by weight of the total amount of monomers and cross-linking agent, solid content of 23%) was added.

Comparative Example 1

A sheet for adhesive labels was produced in the same manner as in Example 1, except that, in the process of incorporating an additive, 0.11 g of the aziridine cross-linking agent (0.2 parts by weight, based on 100 parts by weight of the total amount of monomers and cross-linking agent) was added.

Comparative Example 2

A sheet for adhesive labels was produced in the same manner as in Example 1, except that, in the process of incorporating an additive, 1.1 g of the aziridine cross-linking agent (2 parts by weight, based on 100 parts by weight of the total amount of monomers and cross-linking agent) was added.

Comparative Example 8

A sheet for adhesive labels was produced in the same manner as in Example 1, except that, in the process of incorporating an additive, a styrene-butadiene rubber (SBR) solution having a (solid content of 23%) was not added.

Comparative Example 4

A sheet for adhesive labels was produced in the same manner as in Example 1, except that, in the process of incorporating an additive, 23.9 g of the styrene-butadiene rubber (SBR) solution having a solid content of 23% (to parts by weight, based on 100 parts by weight of the total amount of monomers and cross-linking agent) was added.

Comparative Example 5

A sheet for adhesive labels was produced in the same manner as in Example 1, except that, in the process of incorporating an additive, 71.7 g of the styrene-butadiene rubber (SBR) solution having a solid content of 23% (30 parts by weight, based on 100 parts by weight of the total amount of monomers and cross-linking agent) was added.

Comparative Example 6

A sheet for adhesive labels was produced in the same manner as in Example 1, except that, in the process of incorporating an additive, no plasticizer solution was used.

Comparative Example 7

A sheet for adhesive labels was produced in the same manner as in Example 1, except that, in the process of incorporating an additive, 1 g of the plasticizer solution (1 part by weight, based on 100 parts by weight of the total amount of monomers and cross-linking agent) was added.

Comparative Example 8

A sheet for adhesive labels was produced in the same manner as in Example 1, except that, in the process of incorporating an additive, 10 g of the plasticizer solution (10 parts by weight, based on 100 parts by weight of the total amount of monomers and cross-linking agent) was added.

Comparative Example 9

A sheet for adhesive labels was produced in the same manner as in Example 1, except that, the aziridine cross-linking agent, the styrene-butadiene rubber (SBR) solution and the plasticizer solution were not added.

Comparative Example 10

A sheet for adhesive labels was produced in the same manner as in Example 1, except that the styrene-butadiene rubber (SBR) solution and the plasticizer solution were not added.

EXPERIMENTAL EXAMPLE

The physical properties of sheets for adhesive labels produced in Examples 1 to 6 and Comparative Examples 1 to 10 were measured in accordance with the following method. The results are shown in Table 1 below.

1) Measurement Method of Room Temperature Adhesive Strength (90 Peel):

The sheet for adhesive labels thus produced was evaluated in accordance with a KS A 1107 adhesive strength measurement method. Specifically, five specimens with a size of 2.5 cm×20 cm were prepared, attached to a glass surface, and rolled out back and forth 5 times at a rate of 300 mm/min using a 2 kg roller. After 20 minutes, the specimens were peeled out at 90 degrees at a rate of 5 mm/sec under conditions of 23° C. and 50% humidity and the adhesive strength thereof was measured. The target adhesive strength level was 300 to 500 gf/in.

2) Measurement Method of Initial Adhesive Strength (Ball Tack)

The sheet for adhesive labels was evaluated in accordance with the KS A 1107 initial adhesive strength measurement method. Specifically, a ball was rolled on adhesive specimens with a length of 10 cm arranged on a 30° sloped surface and was then stood for 5 seconds or longer. At this time, the size of the ball was measured. The target ball size level was No. 5 or more.

3) Measurement method of heat resistance:

Three specimens with a size of 2.5 cm×15 cm were prepared from the sheet for adhesive labels and attached to an outer wall of a 500 ml PE bottle. The specimens were stored in an oven at 50° C. for one hour and allowed to stand at room temperature for 3 days. Then, a state in which the sheet is attached to the outer wall of the bottle was qualitatively evaluated. The target state was that the adhesive sheet was closely attached to the wall surface of PE without causing air tunnel or separation.

⊚: Neither separation nor air tunnel
○: No separation, but slight air tunnel
Δ: Slight separation and air tunnel
X: Serious separation 4) Measurement Method of Removal Noise:

Specimens with a size of 2.5 cm×15 cm of the sheet for adhesive labels were prepared. Then, the specimens were attached to a glass surface and immediately peeled therefrom, this attachment/peel process was repeated 10 or more times and removal noise generated during this process was evaluated. The removal noise was graded from 0 to 4.0 means little or no noise and 4 means the most noise. The target level of removal noise was 1 or less.

0: Little or no noise
1: Very slight noise
2: Slight noise
3: Serious noise
4: Very serious noise 5) Ghost Measurement Method:

Three specimens with a size of 2.5 cm×15 cm of the sheet for adhesive labels were prepared and then attached to a mirror surface. These specimens were stored in an oven at 50° C. for one hour and allowed to stand at room temperature for 3 days, the adhered sheets were peeled from the mirror surface and residues generated on the mirror surface was qualitatively evaluated. The intended state was that the sheets did not leave any ghost on the mirror surface after being peeled therefrom and the mirror surface was kept clean.

TABLE 1

| Ex. No. | Room-temperature adhesive strength (kgf/in) | Initial adhesive strength (Ball No.) | Heat resistance | Removal noise | Ghost |
| --- | --- | --- | --- | --- | --- |
| Ex. 1 | 380 | 6 | ⊚ | 1 | No |
| Ex. 2 | 320 | 5 | ⊚ | 1 | No |
| Ex. 3 | 340 | 5 | ⊚ | 1 | No |
| Ex. 4 | 450 | 7 | ⊚ | 1 | No |
| Ex. 5 | 470 | 9 | ⊚ | 1 | No |
| Ex. 6 | 380 | 6 | ⊚ | 1 | No |
| Comp. Ex. 1 | 430 | 8 | ⊚ | 2 | No |
| Comp. Ex. 2 | 280 | 3 | ⊚ | 1 | No |
| Comp. Ex. 3 | 120 | 1 | X | 0 | No |
| Comp. Ex. 4 | 320 | 3 | ○ | 1 | No |
| Comp. Ex. 5 | 560 | 8 | ⊚ | 2 | No |
| Comp. Ex. 6 | 670 | 14 | ⊚ | 3 | No |
| Comp. Ex. 7 | 590 | 11 | ⊚ | 2 | No |
| Comp. Ex. 8 | 270 | 4 | ○ | 0 | Slight |
| Comp. Ex. 9 | Transferred | 6 | X | 4 | Bad |
| Comp. Ex. 10 | 250 | 3 | Δ | 1 | No |

As shown in the above Table 1, Examples 1 to 6 using the aziridine cross-linking agent exhibited improved cohesive strength of resin prior to use, were free of ghosts and considerably reduced removal noise, as compared to Comparative Example 9. It can be seen that the amount of aziridine cross-linking agent used was preferably 0.5 to 1.9 parts by weight in terms of room temperature adhesive strength, initial adhesive strength (tack) and removal noise (See Comparative Examples 1 and 2). In particular, Comparative Example 1 exhibited bad removal noise, the most essential physical property of the removable adhesive.

In addition, Examples 1 to 6 using a rubber based resin as a resin exhibited considerably improved room temperature, initial adhesive strength (tack) and heat resistance, as compared to Comparative Example 3 using no rubber resin. When the content of rubber based resin was higher than so parts by weight (Comparative Example 5), removal noise increased and when the content was lower than 15 parts by weight (Comparative Example 4), initial adhesive strength (tack) was bad. Accordingly, it can be seen that the content of rubber based resin is preferably 15 to 25 parts by weight in terms of room temperature and initial adhesive strength (tack), heat resistance and removal noise.

Meanwhile, Examples 1 to 6 in which a plasticizer was applied to the resin, exhibited improved removal noise, but considerable deterioration in room temperature and initial adhesive strength (tack) as the amount of plasticizer increased, as compared to Comparative Example 6 in which a plasticizer was not used. Comparative Example 8, in which the plasticizer was present in an amount of 10 parts by weight, exhibited ghosts. Accordingly, it can be seen that the content of plasticizer is preferably 1.1 to 9.9 parts by weight in terms of room temperature adhesive strength, initial adhesive strength (tack), removal noise and ghosts.

Furthermore, it can be seen that Examples 1 to 5, in which all of interior cross-linking agent, exterior cross-linking agent, rubber based resin and plasticizer solution were applied to the resin, exhibited improved room temperature and initial adhesive strength (tack) and heat resistance, as compared to Comparative Example 10 in which only an exterior cross-linking agent is applied to the resin.

In addition, Example 6 in which the exterior cross-linking agent, rubber based resin and plasticizer solution were applied to the resin, despite absence of any interior cross-linking agent (such as AMA), exhibited only slight increase in room temperature and initial adhesive strength (tack) and had no great effect on physical properties such as removal noise or ghosts, as compared to Example 3 in which only interior cross-linking agent was applied.

The invention claimed is:

1. A method for preparing a removal adhesive comprising:
preparing a neutralized acrylic adhesive solution of a resin (A), prepared by:
adding an anionic emulsifier and 0.1 to 3 parts by weight of an ammonium persulfate polymerization initiator to 100 parts by weight of a monomer mixture comprising (i) greater than 90 to 99.9% by weight of a (meth)acrylic acid ester monomer having an alkyl group having 1 to 14 carbon atoms, (ii) 0.1 to less than 2% by weight of a monomer having a carboxyl group or a hydroxyl group, or a mixture thereof; and (iii) less than 0.1% by weight of a cross-linking agent having an acrylate group or vinyl group, and
neutralizing the solution of resin (A);
adding 0.3 to 1.9 parts by weight of a compound having a structure of below Formula 1 (B), relative to 100 parts by weight of resin (A),
adding 15 to 25 parts by weight of a rubber based resin (C), relative to 100 parts by weight of resin (A), and
adding 1.65 to 2.75 parts by weight of plasticizer (D), relative to 100 parts by weight of resin (A), wherein the plasticizer is acetyl tributyl citrate,
wherein the prepared removal adhesive is free of ghosts, <Formula 1>

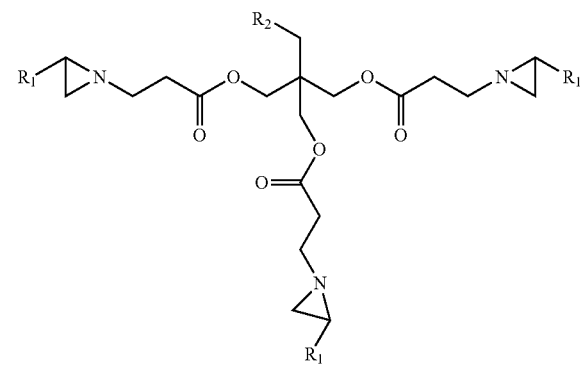

wherein $R_1$ is a hydrogen atom or an alkyl group having 1 to 10 carbon atoms and $R_2$ is a hydroxyl group or an alkyl group having 1 to 12 carbon atoms.

2. The method according to claim 1, comprising neutralizing the solution of resin (A) to a pH of 8.0.

3. An adhesive sheet formed by coating one side of a surface paper with an adhesive prepared by the method of claim 1.

4. The adhesive sheet according to claim 3, wherein the surface paper is a paper sheet.

* * * * *